UNITED STATES PATENT OFFICE

MAX BOMMER, GUILLAUME DE MONTMOLLIN, AND JAROSLAW FRÖHLICH, OF BASEL, AND FRITZ GRIESHABER, OF RIEHEN, NEAR BASEL, AND WOLFGANG JAECK, OF BASEL, AND FRIEDRICH FELIX, OF RIEHEN, NEAR BASEL, SWITZERLAND, ASSIGNORS TO THE FIRM: SOCIETY OF CHEMICAL INDUSTRY IN BASLE, OF BASEL, SWITZERLAND

PREPARATION OF DYESTUFFS WHICH ARE OF VALUE FOR OBTAINING FAST TINTS ON THE DIFFERENT FIBERS AND PROCESS OF MAKING SAME

No Drawing. Application filed March 11, 1926, Serial No. 94,082, and in Switzerland March 20, 1925.

It has been found that new solid and dry dyestuff preparations from in water insoluble dyestuffs may be obtained by drying the pastes made by mixing or milling the insoluble dyestuffs with a solution of sulphite cellulose waste liquor, in some cases after addition of another colloid. As sulphite cellulose waste liquor there is to be understood the raw sulphite cellulose waste liquor and its principal constituents i. e. the salts of the lignin sulphonic acid.

As another colloid there may be named casein, or a salt of a sulphonated soap, or glue.

In this manner there are obtained dry solid preparations of dyestuffs and dry sulphite cellulose waste liquor as principal constituents which can be very easily dispersed in water with formation of colloidal suspensions or solutions, which are suitable for many purposes. They form yellow to dark-brown, red, blue and green powders, which, when introduced into lukewarm water, yield yellow to orange, red, violet, blue and green colloidal solutions or suspensions.

For example, when an anthraquinone vat dyestuff is treated in this manner there is obtained a powder which in water becomes immediately dispersed with formation of a suspension which is so fine that on addition of hydrosulphite and caustic soda solution it is instantaneously vatted. The powder can also be used with advantage in cotton printing, and indeed particularly in processes in which the dyestuff is first reduced by steaming, for in this case very even prints are obtained even in light tones.

When indigoid dyestuffs or vat dyestuffs derived from benzoquinone are used i. e. the vat dyestuffs which contain the atom grouping

wherein the double linkings of one of two C atoms are linked to a carbonylic oxygen atom, Z meaning S or NH, the preparations obtained not only show the properties recited in the previous paragraph but can be vatted in presence of alkalies which are not caustic. Thus it is possible by adding alkali metal carbonate and hydrosulphite to these preparations to obtain vat preparations which are distinguished from those made with aid of caustic alkalies by being of considerably greater durability, and, owing to the absence of caustic alkali, are particularly suitable for wool dyeing.

Finally, when other insoluble dyestuffs, like indophenols, aminoanthraquinones, unsulphonated azo dyestuffs, quinophthalones are used, powders are obtained which are dispersed in water, particularly in presence of a soap or a sulphonated soap, with formation of colloidal solutions or suspensions. In this manner dyebaths are obtained which dye acetyl cellulose or acetate silk corresponding colors. The manufacture of these preparations presents an essential progress as compared with the pastes of unsulphonated dyestuffs hitherto marketed for acetate silk dyeing.

The following examples illustrate the invention, the parts being by weight:—

Example 1

100 parts of flavanthrene corresponding with the formula:

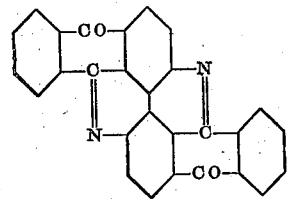

are dissolved in 1000 parts of concentrated sulphuric acid and the solution is poured upon ice and then filtered. The solid matter is washed until acid reaction disappears, and is then stirred with 200 parts of sulphite cellulose liquor of 50 per cent. strength and the mixture is dried and milled. The yellow powder obtained in this manner yields with water a yellow colloidal solution and with hydrosulphite and dilute caustic soda solution immediately a vat. In cotton printing the dyestuff preparation can be added to the thickening either directly or after it has been made into a paste with a little water. The printing color thus obtained yields completely even prints, even in light tones.

Similar results are obtained when other vat-dyestuffs of the anthraquinone series, such as N-dihydro-1:2:1′:2′-anthraquinoneazine, or a substitution product thereof, are treated in the manner described.

The N-dihydro-1:2:1′:2′-anthraquinoneazine yields blue to dark blue powders which form in water colloidal blue solutions; the halogenated N-dihydro-1:2:1′:2′-anthraquinoneazine yields blue to dark blue or green powders, which form in water colloidal blue to green solutions. Violet to green products are obtained with the dyestuffs of the dibenzanthrone series.

*Example 2*

100 parts of ciba violet B corresponding with the formula

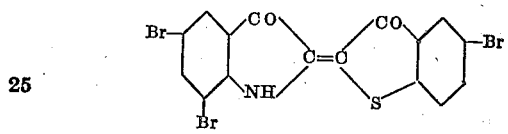

(cf. colour index No. 1222) are treated as prescribed in Example 1. There is obtained a violet powder, which forms in water a colloidal violet solution, and which yields a vat immediately in alkaline hydrosulphite solution. When made into a paste with a little water it can be added directly to the thickening for color printing, thus making a printing color which yields remarkable even and sharp prints. When mixed with sodium carbonate and hydrosulphite the preparation dissolves easily in warm water with formation of a vat very suitable for dyeing cotton, and particularly wool.

The other indigoids yield analogous results. Thus there are obtained inter alia with thioindigo a red powder yielding a bluish-red colloidal solution, with indigo or halogenated indigos blue powders, yielding blue colloidal solutions.

*Example 3*

14.5 parts of 2:5-dianilidobenzoquinone corresponding with the formula:

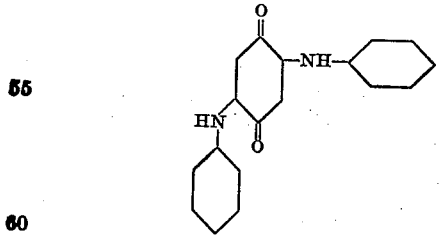

are made into a paste as usual and then stirred with 14 parts of a solution of Monopol soap of 50 per cent. strength and 14 parts of sulphite cellulose waste liquor of 50 per cent. strength, the mixture is then dried and milled. There is obtained a dark brown powder which forms in water a colloidal brownish-yellow solution, and which can be vatted immediately in likewarm water to which caustic soda solution and hydrosulphite has been added. The vat preparation obtained by mixing the dyestuff preparation with sodium carbonate and hydrosulphite is particularly suitable for dyeing wool.

The brown dyestuffs of the British patent specification No. 19599/1912 and the additions thereto or of Example 4 of the British specification No. 237375 yield dark brownish powders, yielding brown colloidal solutions.

*Example 4*

12.5 parts of 2:5-dianilido-1:4-benzoquinone, 18.2 parts of anhydrous sodium carbonate or the same quantity of potash, borax or sodium phosphate, 50 parts of Monopol soap solution of 10 per cent. strength and 50 parts of sulphite cellulose liquor of 50 per cent. strength are ground together to a very fine state of subdivision in a suitable mill. The mass is then dried in a vacuum and finally mixed with 9 parts of sodium hydrosulphite. The preparation thus obtained has no carbylamine odor and it dissolves in lukewarm water with formation of a bright yellow red vat, which dyes wool fast full yellow tints.

*Example 5*

35 parts of the brown vat dyestuff made from dianilidobenzoquinone by action of sulphur dichloride as described in Example 4 of the British specification No. 237375 are ground in a suitable mill together with 53 parts of potash, 25 parts of a solution of Monopol soap of 10 per cent. strength, 25 parts of water and 20 parts of sulphite cellulose liquor of 50 per cent. strength. The rest of the procedure is as described in the previous example, 60 parts of hydrosulphite being used. The preparation obtained can be vatted in warm water to a light brown vat which dyes wool fast brown tints. The brown vat dyestuffs of the British patent specification No. 19599/1912 and the additions thereto behave similarly.

*Example 6*

There is made, as described in the preceding example, a mixture of 35 parts of the brown dyestuff of Example 4 of the British patent specification No. 237,375, 35 parts of indigo, 106 parts of anhydrous sodium carbonate, 500 parts of Monopol soap solution of 10 per cent. strength and 20 parts of sulphite cellulose liquor of 50 per cent. strength; the mixture is dried in a vacuum and ground with 130 parts of sodium hydrosulphite. The preparation thus obtained forms in lukewarm water a vat which dyes wool fast black shades.

Example 7

A mixture of 20 parts of tetrabromindigo, 30 parts of sodium carbonate, and 60 parts of sulphite cellulose liquor of 50% strength is milled and dried. There is obtained a blue powder which, when mixed with 30 parts of hydrosulphite, dissolves in water to a greenish solution, forming a vat which dyes cotton fast full blue tints.

The procedure is similar with other dyestuffs or mixture of dyestuffs. Thus from thioindigo there are obtained preparations which dye wool or cotton red tints; from mixtures of a dianilidoquinone and 2-thionaphthene-acenaphtheneindigo or from mixtures of a dianilidoquinone and indirubin, there are obtained preparations which dye wool orange to bordeaux tints.

Example 8

1 part of spirit-soluble quinoline yellow (compare Schultz, Farbstofftabellen, 5th Edition, No. 612) is mixed with 3 parts of sulphite cellulose liquor of 30° Baumé and the mixture is evaporated at ordinary pressure in presence of 0.1 part of ammonia. The product is finely milled and in this condition yields when covered with water a finely dispersed colloidal solution, particularly in presence of some soap or a sulphonic acid of an unsaturated fatty acid or a salt thereof. The solution dyes acetate silk pure green yellow and the dyeing obtained is fast to soap and water.

Example 9

1 part of the dyestuff from diazotized paranitraniline and cresidine corresponding with the formula:

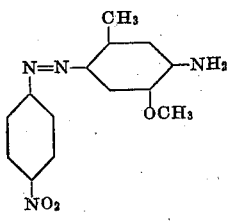

is intimately mixed with 2 parts of a soluble salt of ligninsulphonic acid and 0.5 part of a casein solution of 10 per cent. strength, and the mixture is evaporated under diminished pressure, advantageously in presence of a small proportion of an alkaline substance, such as ammonia, sodium carbonate or borax. The product is finely ground, it forms a red powder having the properties indicated in the introduction to this specification. It produces red tints on acetate silk, which when diazotized on the fibre and developed with ethyl-α-naphthylamine become a black which is fast in every respect.

Example 10

1 part of amino-azo-toluene is intimately mixed with 1 part of sulphite cellulose liquor of 30° Baumé and dried with exclusion of air. The product when thoroughly milled is a red yellow powder soluble in water to a colloidal solution, which dyes acetate silk vivid yellow; this dyeing is fast to light, water and soap.

Example 11

1 part of the indophenol from nitrosophenol and diphenylamine corresponding with the formula:

is mixed with 2 parts of sulphite cellulose liquor of 30° Baumé and the mixture is dried. The product when finely milled is a powder which forms a fine emulsion with warm water which, particularly on addition of soap, dyes acetate silk blue violet of good properties of fastness.

Example 12

1 part of 1-amino-4-para-tolylaminoanthraquinone corresponding with the formula:

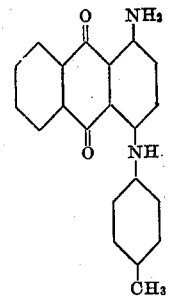

is mixed with 2 parts of sulphite cellulose liquor of 30° Baumé, and the mixture is dried in a vacuum. The finely milled product is very finely dispersed in water and it is very well adsorbed by acetate silk and dyes the latter a beautiful blue. This dyeing is fast to light, water and soap.

What we claim is:

1. As new articles of manufacture the dry in water easily dispersable preparations containing in mixture dry water insoluble dyestuffs as well as at least 20 per cent. of dry sulfite cellulose waste liquor as principal constituents, which products form yellow to dark brown, red, blue and green powders, which, when introduced into lukewarm water, yield yellow to orange, red, violet, blue and green colloidal solutions or suspensions.

2. As new articles of manufacture the dry in water easily dispersable preparations containing in mixture dry water insoluble vat dyestuffs as well as at least 20 per cent. of dry sulfite cellulose waste liquor as principal constituents, which products form yellow to dark brown, red, blue and green powders, which, when introduced into lukewarm water, yield yellow to orange, red, violet, blue and green colloidal solutions or suspensions, and which, when introduced into a lukewarm alkaline solution of hydrosulfite or mixed with an alkali and hydrosulfite and then introduced into lukewarm water, yield very quickly the vats of the corresponding dyestuffs.

3. As new articles of manufacture the dry preparations containing in mixture dry water insoluble vat dyestuffs as well as at least 20 per cent. of dry sulfite cellulose waste liquor and further an alkali metal carbonate and hydrosulfite as constituents, which products form yellow to dark brown, red, blue and green powders, which, when introduced into lukewarm water, yield yellow to orange, red, violet, blue and green colloidal solutions or suspensions and which, when introduced into likewarm water, yield very quickly the vats of the corresponding dyestuffs.

4. As new articles of manufacture the dry in water easily dispersable preparations containing in mixture dry water insoluble vat dyestuffs as well as at least 20 per cent. of dry sulfite cellulose waste liquor and further a soluble salt of a sulfonated soap as constituents, which products form yellow to dark brown, red, blue and green powders, which, when introduced into lukewarm water, yield yellow to orange, red, violet, blue and green colloidal solutions or suspensions and which, when introduced into a lukewarm alkaline solution of hydrosulfite or mixed with an alkali and hydrosulfite and then introduced into lukewarm water, yield very quickly the vats of the corresponding dyestuffs.

5. As new articles of manufacture the dry in water easily dispersable preparations containing in mixture dry water insoluble vat dyestuffs of the anthraquinone series as well as at least 20 per cent. of dry sulfite cellulose waste liquor as principal constituents, which products form yellow to dark brown, red, blue and green powders, which, when introduced into lukewarm water, yield yellow to orange, red, violet, blue and green colloidal solutions or suspensions and which, when introduced into a lukewarm alkaline solution of hydrosulfite or mixed with an alkali and hydrosulfite and then introduced into lukewarm water, yield very quickly the vats of the corresponding dyestuffs.

6. As new articles of manufacture the dry in water easily dispersable preparations containing in mixture dry water insoluble vat dyestuffs of the N-dihydro-1:2:1′:2′-dihydroanthraquinoneazine type as well as at least 20 per cent. of dry sulfite cellulose waste liquor as principal constituents, which products form dark blue and green powders, which, when introduced into lukewarm water, yield yellow to orange, red, violet, blue and green colloidal solutions or suspensions and which, when introduced into a lukewarm alkaline solution of hydrosulfite or mixed with an alkali and hydrosulfite and then introduced into lukewarm water, yield very quickly the vats of the corresponding dyestuffs.

7. As new articles of manufacture the dry in water easily dispersable preparations containing in mixture dry water insoluble vat dyestuffs of the type of the halogenated N-dihydro-1:2:1′:2′-dihydroanthraquinoneazine as well as at least 20 per cent. of dry sulfite cellulose waste liquor as principal constituents, which products form dark blue and green powders, which, when introduced into lukewarm water, yield yellow to orange, red, violet, blue and green colloidal solutions or suspensions and which, when introduced into a lukewarm alkaline solution of hydrosulfite or mixed with an alkali and hydrosulfite and then introduced into lukewarm water, yield very quickly the vats of the corresponding dyestuffs.

In witness whereof we have hereunto signed our names this 1st day of March 1926.

MAX BOMMER.
GUILLAUME DE MONTMOLLIN.
JAROSLAW FRÖHLICH.
FRITZ GRIESHABER.
WOLFGANG JAECK.
FRIEDRICH FELIX.